United States Patent
Chiu et al.

(10) Patent No.: US 8,856,476 B2
(45) Date of Patent: *Oct. 7, 2014

(54) SYSTEMS, METHODS, AND PHYSICAL COMPUTER STORAGE MEDIA TO OPTIMIZE DATA PLACEMENT IN MULTI-TIERED STORAGE SYSTEMS

(75) Inventors: Lawrence Y. Chiu, Saratoga, CA (US); Yong Guo, Shanghai (CN); Chao G. Li, Shanghai (CN); Yang Liu, Shanghai (CN); Paul Muench, San Jose, CA (US); Sangeetha Seshadri, Vancouver, WA (US)

(73) Assignee: International Business Machines Corporation, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 13/531,845

(22) Filed: Jun. 25, 2012

(65) Prior Publication Data

US 2012/0303929 A1 Nov. 29, 2012

Related U.S. Application Data

(63) Continuation of application No. 13/117,236, filed on May 27, 2011.

(51) Int. Cl.
*G06F 12/00* (2006.01)
*G06F 13/00* (2006.01)
*G06F 13/28* (2006.01)
*G06F 12/02* (2006.01)

(52) U.S. Cl.
CPC .................................... *G06F 12/02* (2013.01)
USPC .......................................................... 711/165

(58) Field of Classification Search
USPC ......................................................... 711/165
See application file for complete search history.

(56) References Cited

U.S. PATENT DOCUMENTS

| | | | |
|---|---|---|---|
| 7,496,725 B2 | 2/2009 | Burton et al. | |
| 8,103,764 B2 * | 1/2012 | Aviles | 709/224 |
| 8,171,245 B2 * | 5/2012 | Maruyama et al. | 711/161 |
| 8,275,748 B2 * | 9/2012 | Nagarajan | 707/652 |
| 8,280,854 B1 * | 10/2012 | Emmert | 707/664 |
| 2007/0239747 A1 | 10/2007 | Pepper | |
| 2007/0299959 A1 | 12/2007 | Penny et al. | |
| 2008/0155218 A1 | 6/2008 | Elliott et al. | |
| 2010/0082765 A1 | 4/2010 | Murase | |
| 2011/0131589 A1 * | 6/2011 | Beaty et al. | 719/318 |
| 2012/0130987 A1 * | 5/2012 | Bose et al. | 707/718 |
| 2012/0310995 A1 * | 12/2012 | Subramaniam et al. | 707/809 |

* cited by examiner

*Primary Examiner* — Michael Alsip
(74) *Attorney, Agent, or Firm* — Griffiths & Seaton PLLC

(57) ABSTRACT

For optimizing data placement in a multi-tiered storage system, system configuration data and system performance data is collected. A plurality of data movement plans are generated, based in part on the system configuration data and the system performance data. A conflict between the plurality of data movement plans are arbitrated to form an execution plan. The data movement plans are performed according to the execution plan.

7 Claims, 4 Drawing Sheets ns, METHODS, AND PHYSICAL COMPUTER STORAGE MEDIA TO OPTIMIZE DATA PLACEMENT IN MULTI-TIERED STORAGE SYSTEMS

CROSS REFERENCE TO RELATED APPLICATION

This application is a Continuation of U.S. patent application Ser. No. 13/117,236, filed on May 27, 2011.

FIELD OF THE INVENTION

The present invention relates in general to storage systems, and in particular to controlling multi-tiered storage systems.

DESCRIPTION OF THE RELATED ART

Multi-tiered storage systems typically include multiple logical and physical storage devices. These storage devices are divided into multiple levels, wherein each level is assigned a priority. Data is stored in particular ones of the storage devices, based on the expected demand for a particular set of the data and a desired level of performance from the storage devices.

In an example, a multi-tiered storage system may be a three-tier system. In such case, a plurality of storage devices having very high performance capabilities (e.g., for frequent data access and minimal access delay) is employed in a highest level of the tiered storage system. This tier of the tiered storage system is sometimes referred to as the "online" tier or T0 and typically consists of storage devices which are the most expensive to manufacture and to purchase. A middle tier of the tiered storage system, sometimes referred to as the "nearline" tier or T1, has storage devices having a lower performance capability than T0 but that perform sufficiently to handle regularly accessed data or data capable of tolerating larger access delays due to lower performance measures of the storage devices. There may be multiple middle tiers in a tiered storage system based on the complexity of the tiered storage system and the differing performance capabilities of the storage devices employed. A bottom tier of the tiered storage system, sometimes referred to as the "offline" tier, may be comprised of relatively low performance storage devices. This tier archives or stores data that is infrequently accessed and thus, the access delay associated with these storage devices is not of a concern.

SUMMARY OF THE INVENTION

Although the aforementioned tiered storage systems operate adequately when storing data, they may be improved. In particular, in some cases the system may run several processes concurrently that may seek to optimize data re-allocation of the same data. As a result, the processes may seek to move the same data from an original location to different locations for use. In such case, conflicts may arise as to which process should access the data. Consequently, a higher overhead and lower efficiency for data placement optimization may result.

Currently, some systems allow all processes to run despite the requirement of using the same data. In such cases, the systems may have relatively low efficiency and increased cost due to the data being moved relatively frequently. Other systems include multiple algorithms to mediate the conflicts. However, the multiple algorithms may not complement each other and may cause added conflict within the system. Moreover, adding or removing an algorithm to the existing algorithms may require a redesign of the entire system.

A system, method, and a physical computer storage medium are now provided for controlling a multi-tiered storage system to optimize data placement for a multi-tiered storage system. In an embodiment, by way of example only, the system includes a data collector, a plurality of data placement optimizers, a data placement arbitrator, and a data mover. The data collector is configured to collect system configuration data and system performance data. The plurality of data placement optimizers are each configured to analyze the system configuration data and the system performance data for developing a corresponding data movement plan. The data placement arbitrator is configured to arbitrate conflicts between at least two data movement plans of generated by the plurality of data placement optimizers to form an execution plan. The data mover is configured to perform the data movement plans according to the execution plan.

In another embodiment, by way of example only, the method includes collecting system configuration data and system performance data, generating a plurality of data movement plans, based in part on the system configuration data and the system performance data, arbitrating a conflict between the plurality of data movement plans to form an execution plan, and performing the data movement plans according to the execution plan.

In still another embodiment, by way of example only, the physical computer storage medium includes computer code for collecting system configuration data and system performance data, computer code for generating a plurality of data movement plans, based in part on the system configuration data and the system performance data, computer code for arbitrating a conflict between the plurality of data movement plans to form an execution plan, and computer code for performing the data movement plans according to the execution plan.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide a system for controlling a multi-tiered storage system to optimize data placement for a multi-tiered storage system. Generally, the system includes a data collector, a plurality of data placement optimizers, a data placement arbitrator, and a data mover. The data collector is configured to collect system configuration data and system performance data. The plurality of data placement optimizers are each configured to analyze the system configuration data and the system performance data for developing a corresponding data movement plan. The data placement arbitrator is configured to arbitrate conflicts between at least two data movement plans of generated by the plurality of data placement optimizers to form an execution plan. The data mover is configured to perform the data movement plans according to the execution plan.

With reference now to the figures, example diagrams of data processing environments are provided in which illustrative embodiments of the present invention may be implemented. It should be appreciated that the figures are only examples and are not intended to assert or imply any limitation with regard to the environments in which aspects or embodiments of the present invention may be implemented. Many modifications to the depicted environments may be made without departing from the spirit and scope of the present invention.

Figure 1:
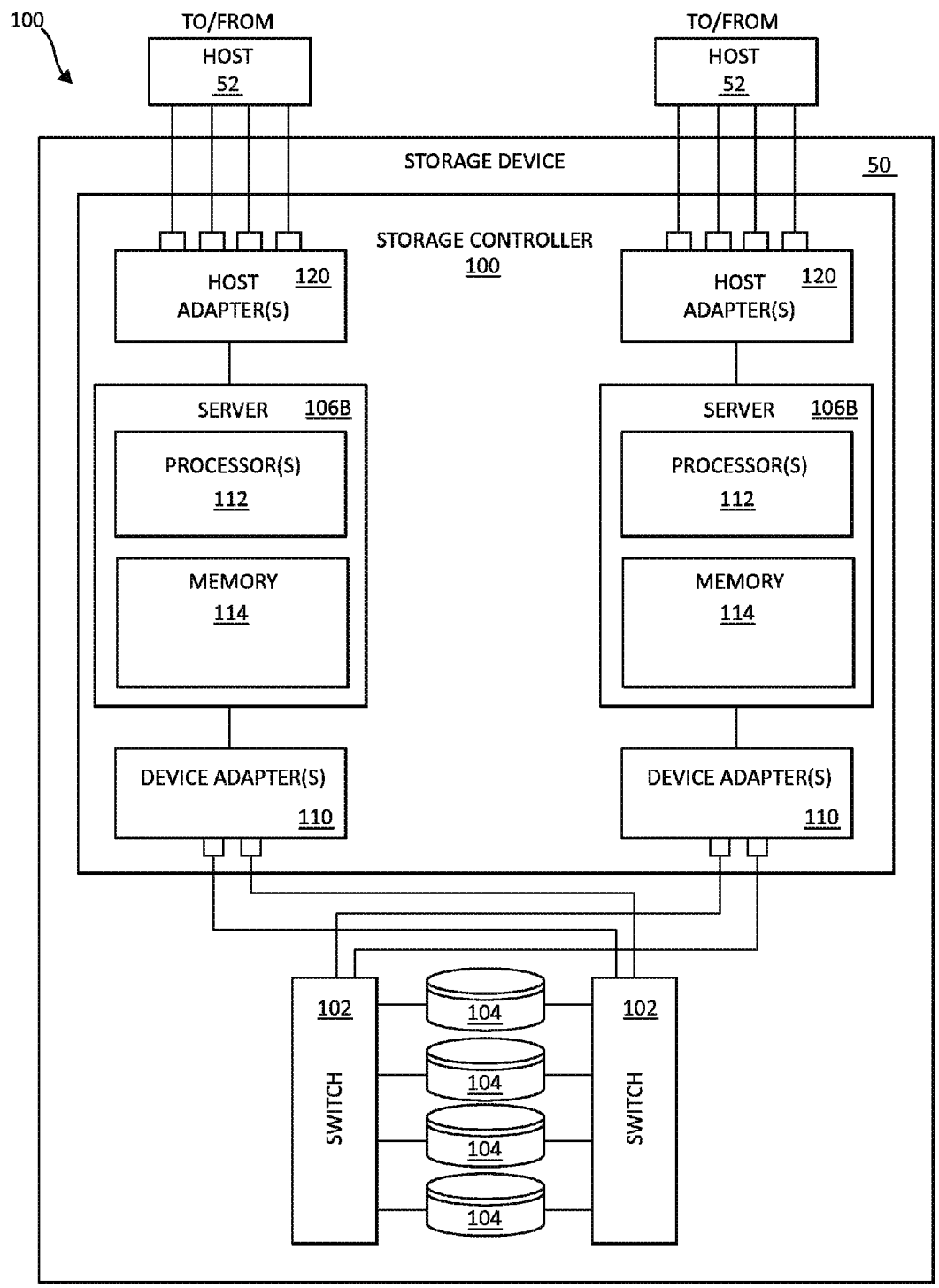
FIG. 1 is an example block diagram of a storage device in which aspects of the illustrative embodiments may be implemented.

With reference now to the figures, FIG. 1 is an example block diagram of a storage device 50 in which aspects of the illustrative embodiments may be implemented.

In one embodiment, the storage device 50 includes a storage controller 100, one or more switches 102, and storage media 104 such as hard-disk drives or solid-state drives. The storage controller 100 enables one or more hosts 52 (e.g., open system and/or mainframe servers) or storage devices 50 to access data in the storage media 104.

In selected embodiments, the storage controller 100 includes one or more servers 106. Although two servers 106 are shown, fewer or more can be included in other embodiments. The storage controller 100 may also include host adapters 120 to connect to host devices 52 and other storage devices 50. The storage controller 100 may also include device adapters 110 to connect to the storage media 104. Multiple servers 106a, 106b may provide redundancy to ensure that data is always available to connected hosts. Thus, when one server 106a fails, the other server 106b may pick up the I/O load of the failed server 106a to ensure that I/O is able to continue between the hosts 52 and the storage devices 50. One example of a storage device 50 having an architecture similar to that illustrated in FIG. 1 is the IBM DS8000™ enterprise storage system (trademark registered to International Business Machines, Inc. of Armonk, N.Y.).

Nevertheless, embodiments of the invention are not limited to being implemented with an IBM DS8000™ enterprise storage system, but may be implemented in any comparable or analogous storage device 40, regardless of the manufacturer, product name, or components or component names associated with the system. Any storage device 50 that could benefit from or be used to implement one or more embodiments of the invention is deemed to fall within the scope of the invention. Thus, the IBM DS8000™ is presented only by way of example.

In selected embodiments, each server 106 may include one or more processors 112 (e.g., n-way symmetric multiprocessors) and memory 114. The memory 114 may include volatile memory (e.g., RAM) as well as non-volatile memory (e.g., ROM, EPROM, EEPROM, hard disks, flash memory, etc.). The memory 114 may store software modules that run on the processor(s) 112 and are used to access data in the storage media 104. The servers 106 may host at least one instance of these software modules, which collectively may also be referred to as a "server," albeit in software form. These software modules may manage all read and write requests to logical volumes in the storage media 104

Figure 2:
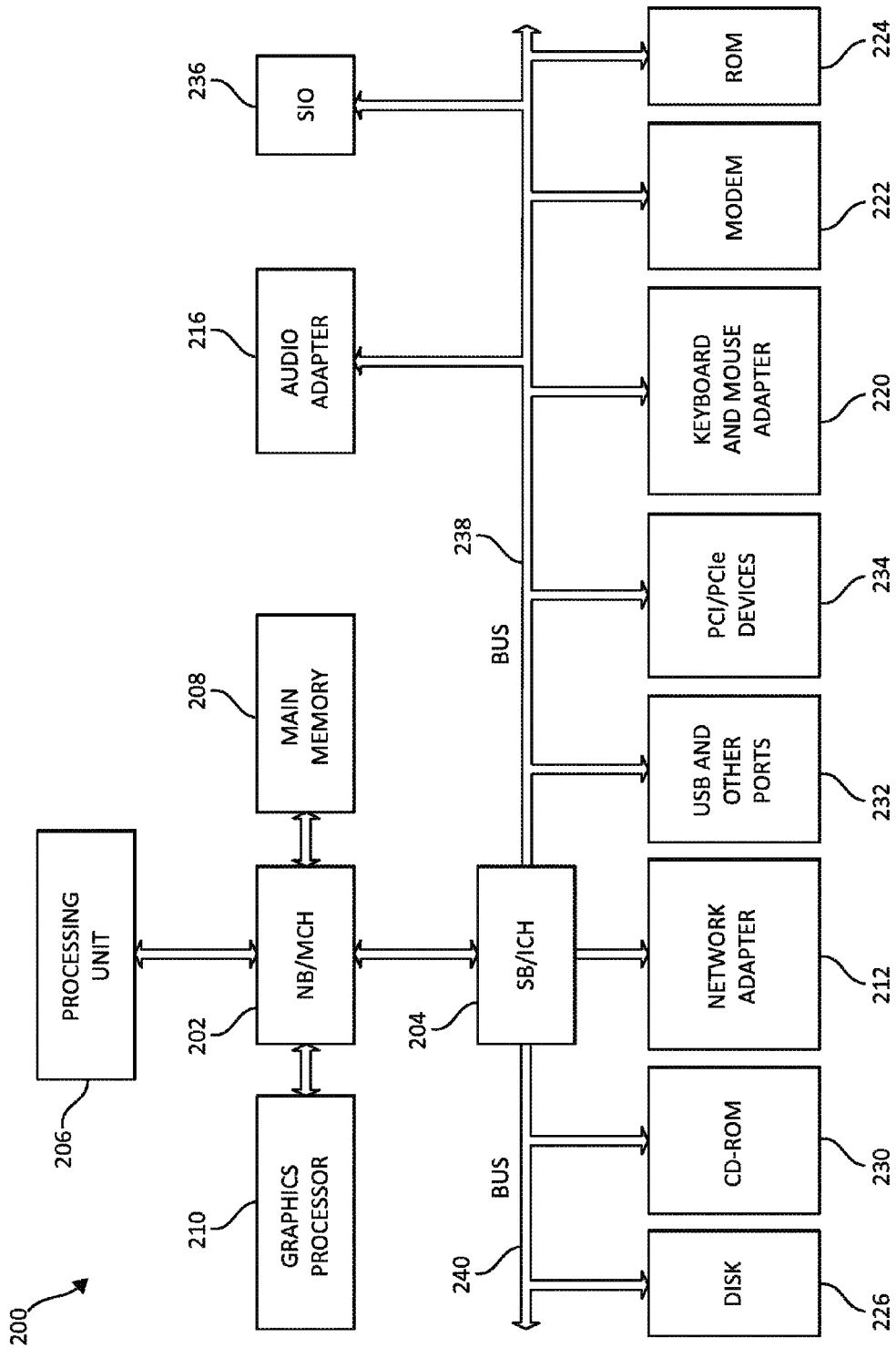
FIG. 2 is an example block diagram of a data processing device in which aspects of the illustrative embodiments may be implemented.

With reference now to FIG. 2, a block diagram of an example data processing system is shown in which aspects of the illustrative embodiments may be implemented. Data processing system 200 is an example of a computer, such as host 52 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed. Moreover, in one illustrative embodiment, the data processing system 200 may be comprised of one or more System p servers with a network of host adapters to communicate over the network 102 in FIG. 1, and a network of RAID adapters to communicate to a plethora of storage devices.

Computer code for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With regard to the illustrative embodiments, one or more of the data processing systems and/or storage systems may include a tiered storage system upon which the mechanisms of the illustrative embodiments may be implemented. The illustrative embodiments operate to optimize movement of data within a tiered storage system so as to make efficient use of the varying performance characteristics of the various tiers of storage devices within the tiered storage system. In another embodiment, a separate server, such as a typical x86 server can be employed, where the server communicates with a tiered storage system through a network.

Figure 3:
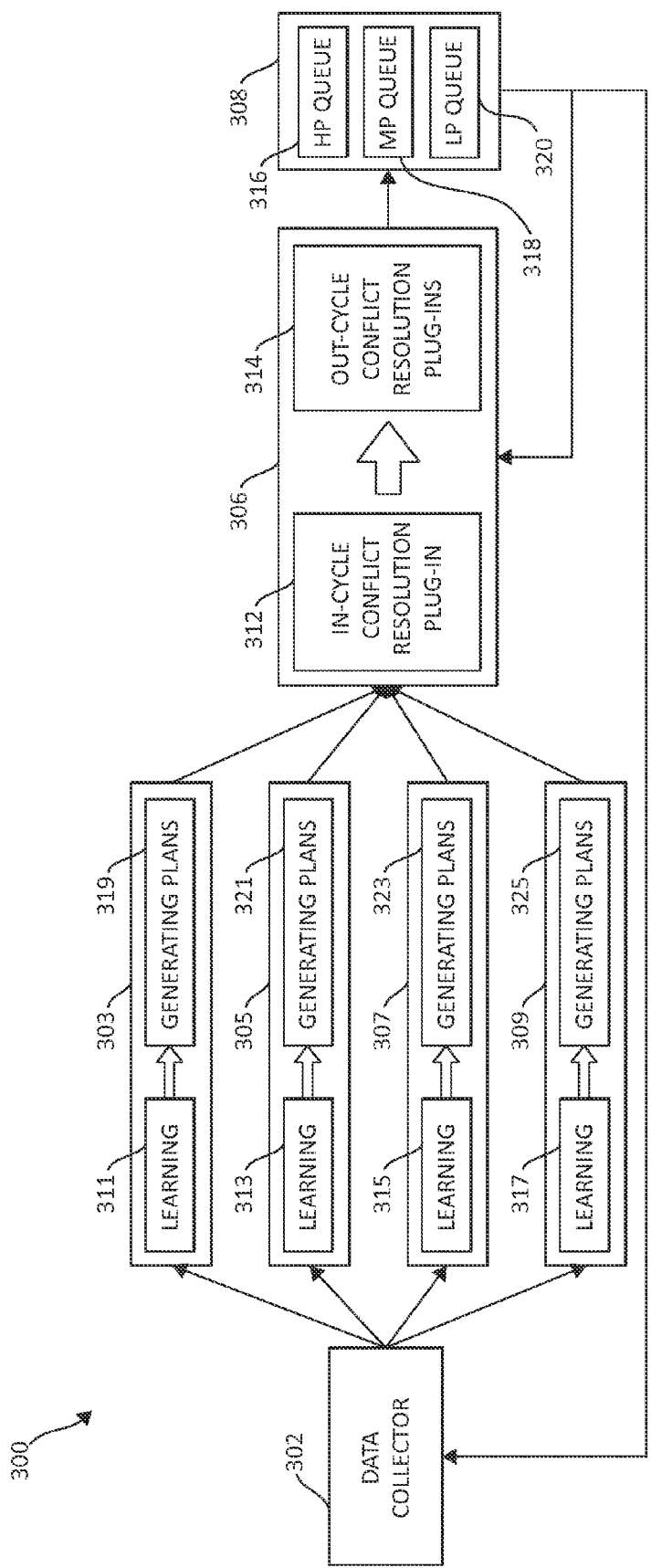
FIG. 3 is a diagram of a framework for use with a multi-tiered storage system, according to an embodiment.

During operation of a tiered storage system, different processes running on the system may attempt to reallocate the same data to different locations. In this regard, the system is configured to include a framework that operates by arbitrating conflicts between two or more data migration plans in order to reduce unnecessary data movement. FIG. 3 is a diagram of a framework 300 for use with a multi-tiered storage system (e.g., storage device 50) according to an embodiment. The framework 300 of the multi-tiered storage system includes a data collector 302, a plurality of data placement optimizers 303, 305, 307, 309, a data placement arbitrator 306, and a data mover 308.

The data collector 302 collects raw data relating to system configuration and system performance. The data collector 302 may reside on one or more servers (e.g., servers 106a, 106b) such as a server including a storage controller (e.g., storage controllers 10100). In an embodiment, the system configuration and performance data are stored on a storage controller. The data collector 302 also can reside in the storage controller. Types of data collected relating to the system configuration include, but are not limited to data related to physical devices configurations and corresponding performance characteristics, changes in configuration changes, such as new device add-ins or removal of devices, changes in states of the system, such as system failover, warmstart or user-changed settings. System performance data include, but are not limited to data related to fine-grained performance for each storage data set which can be moved atomically, data for detecting possible storage device performance overheating and data for setting corresponding flags to notice the data placement optimizers, and data for obtaining performance feedback after the data is moved to its new location, and to refresh to corresponding data placement optimizers.

The data placement optimizers 303, 305, 307, 309 are configured to analyze the raw data collected by the data collector 302 and to learn from the system configuration data and the system performance data to generate a plurality of data migration plans 310. One or more of the data placement optimizers 303, 305, 307, 309 reside on one or more clients (e.g., hosts 52). According to an embodiment, each data placement optimizer 303, 305, 307, 309 includes a learning module 311, 313, 315, 317 and a generating plan module 319, 321, 323, 325. As a result, each data placement optimizer 303, 305, 307, 309 is configured to independently learn and generate a data migration plan. Although four are shown in FIG. 3, there is no limit to the number of data placement optimizers 303, 305, 307, 309 that are included in the framework and thus, no limit to the number of data placement plans that can be generated.

As part of learning, one or more of the data placement optimizers 303, 305, 307, 309 can detect frequently accessed data ("hot data") on a lower storage tier, and to generate a plan to move the hot data to a higher storage tier (such as an upper storage tier) to improve storage performance. In another embodiment, one or more of the data placement optimizers 303, 305, 307, 309 can learn to detect rarely accessed data ("cold data") on the upper storage tier, and to generate a plan to move the data to a lower storage tier to improve the storage total cost of ownership and power usage. In another example, one or more of the data placement optimizers 303, 305, 307, 309 learns to detect hotspot devices within a single tier, and formulates a plan to spread the hotspot to other devices within the tier to improve the storage device utilization.

The data placement optimizers 303, 305, 307, 309 can be configured to learn to detect storage devices within a tier that are overheating, and to generate plans that demote data in the overheated storage device to a lower tier to recover storage performance. In another embodiment, one or more of the data placement optimizers 303, 305, 307, 309 can be configured to learn to interpret a request to move data from a user or from one or more applications to thereby form a movement plan to move the data to specified location for a particular purpose.

The data placement arbitrator 306 is configured to arbitrate conflicts between at least two data migration plans of the plurality of data migration plans to form an execution plan. Specifically, the data placement arbitrator 306 includes a plurality of in-cycle conflict resolution modules 312 and a plurality of out-cycle conflict resolution modules 314 and reside on one or more clients (e.g., hosts 52). The plurality of data migration plans 310 generated by the data placement optimizer 306 are submitted to the in-cycle conflict resolution modules 312. The in-cycle conflict resolution modules 312 operate via "first-in, first-out" and resolve conflicts between the data migration plans by determining an optimal resolution before submitting the data migration plans to execution. In particular, the in-cycle conflict resolution modules 312 include a defined priority tree for all the data placement optimizers 303, 305, 307, 309, so that when the data migration plans 310 presented by multiple data placement optimizers 303, 305, 307, 309 try to move the same data, only the plan 310 from the highest priority data placement optimizer 306 can be submitted for execution.

For example, a first in-cycle conflict resolution module 312 receives the plurality of data migration plans 310 and may identify two of the data migration plans 310 that are slated to access the same data. Then, a determination is made as to whether a first data migration plan has a higher priority than a second data migration plan according to the priority tree. In some cases, the priority tree prioritizes a data migration plan from a data placement optimizer because movement would provide improved system efficiency, or would improve overall storage performance, or comply with a customer application request or recover the system from an occurring overheating condition, and the like. In an embodiment, if the first data migration plan has a higher priority, then that plan is moved forward to another in-cycle conflict resolution module 312 and the second data migration plan is removed from the data placement arbitrator 306 or placed on hold. The first data migration plan is then submitted to the subsequent in-cycle conflict resolution module 312 (e.g., a second, a third, and so on) and a determination is made as to whether the first data migration plan has a higher priority more than a third data migration plan or a fourth data migration plan, and so on. In some cases, the first data migration plan may not have higher priority and may be removed or placed behind another data migration plan, while the higher priority plan may move forward. In this way, all of the data migration plans are reviewed and either placed in an execution plan or removed.

In another embodiment, the data placement arbitrator 306 is configured to select data migration plans from the data placement optimizers 303, 305, 307, 309, based on a predetermined ratio between the data placement optimizers 303, 305, 307, 309. In some cases, the predetermined ratio can be adjusted automatically to satisfy a given desired output by referring to the previously selected data migration plans. In still another embodiment, the data placement arbitrator 306 can be configured to detect a configuration change and can abort a data migration plan that is no longer valid in light of the configuration change.

After the data migration plans have been considered by the in-cycle conflict resolution modules 312, the execution plan is submitted to the out-cycle conflict resolution modules 314. The out-cycle conflict resolution modules 314 can each include a lease time mechanism that prevents migration of data being used by a particular data migration plan from being migrated to another location by a different data migration plan having an equal or lower priority so that the execution plan run for a defined window of time. For example, the defined window of time may be in a range of about 60 minutes to about 7 days. In another embodiment, the defined window of time may be in a range of about 24 hours and 7 days hours. In other embodiments, the time period may be shorter or longer. In addition to the lease time mechanism, the out-cycle conflict resolution modules 312 include a defined priority tree for all the data placement optimizers 303, 305, 307, 309, so that when an attempt is made to move data that is being utilized by a running data migration plan 310 by another data migration plan 310 having an equal or lower priority, the data is protected from movement. However, if the other data migration plan 310 has a higher priority than the running data migration plan 310, the higher priority data migration plan 310 can overwrite the running data migration plan 310 and the data is released to the other data migration plan 310 for use.

The data mover 308 receives the execution plan from the data placement arbitrator 312 and performs the data migration plans according to the execution plan. In an embodiment, the data mover 308 may reside on one or more servers (e.g., servers 104, 106) such as a server including a storage controller (e.g., storage controller 100). According to an embodiment, the data mover 308 includes multiple migration queues each having a different priority so that the data migration plans 310 having higher priority are entered into a corresponding priority queue and those with lower priority are entered into a corresponding priority queue. In this way, the data migration plans in the higher priority queue can be executed faster than those in the lower priority queue. In an embodiment, the data mover includes a high priority queue 316, a middle priority queue 318, and a low priority queue 320. One or more of the queues 316, 318, 320 can include more sub-queues. In other embodiments the data mover includes more than three or fewer than three queues.

To ensure that at least some of the data migration plans in the lower priority queue are executed, the data mover 308 is configured to include a rotation method. In an example, the rotation methods can select queues at different frequency. For example, ten plans in the high priority queue 316 may be selected, five plans in the middle priority queue 318 may be selected, and one plan in the low priority queue 320 may be selected. In this way, the plans are performed at different frequency, and data migration plans in the high priority queue 316 have a longer period of time to run. The data mover 308 is further configured to detect a system resource utilization state so that system performance can be monitored and data migration occurs optimally without detriment to the system.

Figure 4:
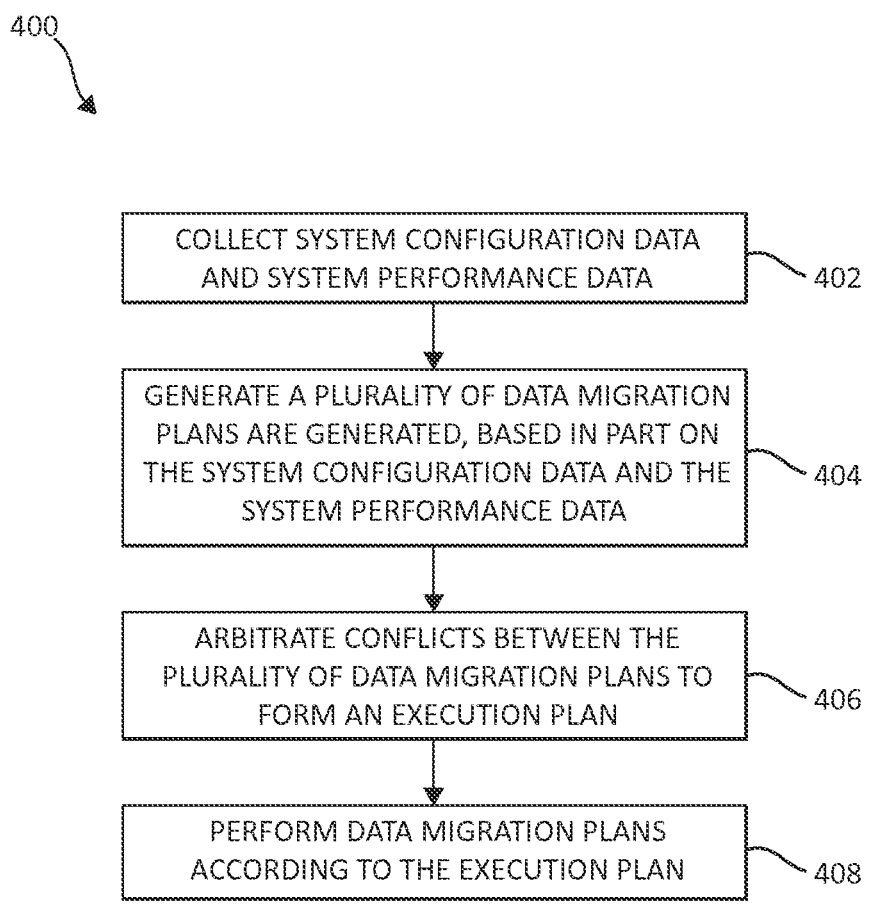
FIG. 4 is a flow diagram of a method of controlling a multi-tiered storage system, according to an embodiment.

FIG. 4 is a flow diagram of a method 400 of for optimizing data placement in a multi-tiered storage system, according to an embodiment. First, system configuration data and system performance data are collected, step 402. In an embodiment, data collection can be performed by a data collector (e.g., data collector 302).

Next, a plurality of data migration plans are generated, based in part on the system configuration data and the system performance data, step 404. Each data migration plan is generated by a data placement optimizer (e.g., data placement optimizer 303, 305, 307, 309). In an embodiment, input/output requests are received by the data optimizers to form the plurality of data migration plans based, in part, on the system configuration data and the system performance data.

Conflicts between the plurality of data migration plans are then arbitrated to form an execution plan, step 406. In an embodiment, the conflicts are resolved by a data placement arbitrator (e.g., data placement arbitrator 306). In an example, a determination is made as to whether a first data migration plan has a higher priority than another data migration plan. According to an embodiment, assuming the first data migration plan has a priority, execution of data migration plans other than the first data migration plans are prevented for a predetermined length of time, if those data migration plans have an equal or lower priority than the priority of the first data migration plan. Despite preventing execution during the predetermined length of time, data migration plans having a higher priority than the priority of the first data migration plan are executed over the first data migration plan.

Next, the data migration plans are performed according to the execution plan, step 408. In an embodiment, step 408 is performed by a data mover (e.g., data mover 308). After the data is moved according to the execution plan, updated system configuration data and updated system performance data are generated. The updated data is collected (e.g., by the data collector) or is provided for consideration as to whether the execution plan should be updated as well.

By including data placement optimizers and a data placement arbitrator as described above, (e.g., inclusion of the multiple data placement optimizers and the in-cycle and out-cycle conflict resolution modules), conflicts between plans generated by the different data placement optimizers are either prevented or resolved to thereby improve the efficiency of data optimization and reduce the unnecessary data movement. Additionally, because each data placement optimizer works independently and is assigned a predetermined priority, redesign of the entire system is avoided when a new data placement optimizer is added or when an existing data placement optimizer is disabled. Moreover, the above-described system provides lower overhead and improves efficiency for data placement optimization.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of optimizing data placement in a multi-tiered storage system, the method comprising:
    collecting system configuration data and system performance data;
    generating a plurality of data movement plans for execution, based in part on the system configuration data and the system performance data;
    arbitrating potential conflicts between the plurality of data movement plans slated to access the same data in the multi-tiered storage system to form an execution plan, wherein arbitrating the potential conflicts is performed prior to execution of the data movement plans and all of the data movement plans generated by the plurality of data placement optimizers are included in the execution plan or removed as a result of the arbitrating; and
    performing the data movement plans according to the execution plan,
wherein:
    the arbitrating further includes maintaining a plurality of priority queues, each priority queue having a different priority, each data movement plan having a priority and being entered into a priority queue having a corresponding priority, and the performing the data movement plans includes executing the data movement plans in a higher priority queue more frequently than the data movement plans in a lower priority queue.

2. The method of claim 1, further comprising updating the execution plan after receiving a result of the performance of the data movement plans.

3. The method of claim 1, further comprising collecting updated system configuration data and updated system performance data as a result of the step of performing.

4. The method of claim 1, further comprising receiving input/output requests to form a plurality of data migration plans based, in part, on the system configuration data and the system performance data.

5. The method of claim 4, further comprising determining whether a first data migration plan has a higher priority than another data migration plan.

6. The method of claim 5, wherein:

the first data migration plan has a priority; and the method further comprises preventing execution of data migration plans other than the first data migration plan for a predetermined length of time, if the data migration plans have an equal or lower priority than the priority of the first data migration plan.

7. The method of claim 6, wherein:

during the step of preventing execution, executing data migration plans having a higher priority than the priority of the first data migration plan to be executed over the first data migration plan.

* * * * *